United States Patent
Ohbe et al.

(10) Patent No.: US 6,296,930 B1
(45) Date of Patent: Oct. 2, 2001

(54) AROMATIC LIQUID CRYSTALLINE POLYESTER RESIN AND RESIN COMPOSITION THEREOF

(75) Inventors: Yoshitaka Ohbe; Kazunori Akiyoshi; Takanari Yamaguchi, all of Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/327,541

(22) Filed: Jun. 8, 1999

(30) Foreign Application Priority Data

Jun. 8, 1998 (JP) .................................. 10-159258
Jun. 30, 1998 (JP) .................................. 10-184587

(51) Int. Cl.⁷ .............................. B32B 3/26; C08G 63/00
(52) U.S. Cl. .................... 428/304.4; 528/190; 528/193; 528/194; 528/206; 528/219; 528/302; 528/308; 528/308.6; 528/361; 264/299; 264/328.1; 264/331.11; 428/357
(58) Field of Search ................................ 528/190, 193, 528/194, 206, 219, 302, 308, 308.6, 361; 264/299, 328.1, 331.11; 428/304.4, 357

(56) References Cited

U.S. PATENT DOCUMENTS

| | | | |
|---|---|---|---|
| 4,333,907 | 6/1982 | Urasaki et al. | 264/290.2 |
| 5,296,542 | * 3/1994 | Layton et al. | 524/600 |
| 5,767,223 | * 6/1998 | Yamada et al. | 528/193 |

FOREIGN PATENT DOCUMENTS

| | | |
|---|---|---|
| 0 737 707 | 10/1996 | (EP) . |
| 0 790 279 | 8/1997 | (EP) . |
| 47-47870 | 12/1972 | (JP) . |
| 50-43223 | 4/1975 | (JP) . |
| 61-102234 | 5/1986 | (JP) . |
| 62-58378 | 12/1987 | (JP) . |
| 1-152123 | 6/1989 | (JP) . |
| 2-3430 | 1/1990 | (JP) . |
| 2-69518 | 3/1990 | (JP) . |
| 6-207109 | 7/1994 | (JP) . |

OTHER PUBLICATIONS

S. Cottis, "Aromatic Polyesters as High Performance Engineering Plastics", 32$^{nd}$ SPE Antec, (1974), pp. 496–498.

* cited by examiner

Primary Examiner—Samuel A. Acquah
(74) Attorney, Agent, or Firm—Sughrue, Mion, Zinn, Macpeak & Seas, PLLC

(57) ABSTRACT

Provided are a aromatic liquid crystalline polyester resin having improved low temperature processability, a film having excellent gas barrier property. The aromatic liquid crystalline polyester resin is obtained from an aromatic hydroxycarboxylic acid, an aromatic dicarboxylic acid and an aromatic diol, by optimizing formulation ratio of the above-described three components. The aromatic liquid crystalline polyester resin comprises an aromatic hydroxycarboxylic acid unit, an aromatic dicarboxylic acid unit and an aromatic diol unit, as repeating units, wherein the repeating unit (A) as an aromatic hydroxycarboxylic acid unit, is contained in an amount of 30 mol % or more based on the total amount of repeating units, and the polyester has a logarithmic viscosity of 1.5 dl/g or more, a flow temperature of 300° C. or less, and a melt tension measured at a temperature higher than the flow temperature by 25° C. or more of 1.0 g or more, (A)

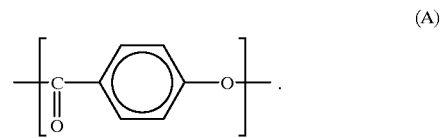

10 Claims, No Drawings

AROMATIC LIQUID CRYSTALLINE POLYESTER RESIN AND RESIN COMPOSITION THEREOF

BACKGROUND OF THE INVENTION

1. Field of the Invention

The present invention relates to an aromatic liquid crystalline polyester resin which is excellent in film molding property (film forming property) and a resin composition thereof.

2. Description of the Related Art

Recently, films produced from various polymers are essential in daily life. For example, there have been developed a variety of films such as high strength films, high elasticity films, oxygen barrier films, conductive films, heat-resistant films, light shielding films and the like. Among other, oxygen barrier films or water vapor barrier films are widely used in our life as wrapping materials irrespective of industrial use or private use.

As the material having oxygen barrier property and water vapor barrier property, liquid crystalline polymers, particularly, a thermotropic aromatic liquid crystalline polyester (hereinafter, sometimes abbreviated as LCP) is noticed, and film forming from this polyester is in investigation. For example, there are reported films made of a liquid crystalline copolyester composed of PET/p-hydroxybenzoic acid (hereinafter, sometimes abbreviated as POB) having an aliphatic chain in the main chain (Japanese Patent Application Publication (JP-B) No. 8-2974) or made of a semi-aromatic liquid crystalline polyester (JP-B No. 6-53383), and films made of a wholly aromatic liquid crystalline polyester (JP-A Nos. 7-323506 and 7-251438), and the like. However, in these investigations, it is difficult to form thin films since molecular orientation occurs in flow direction (MD) which is characteristic of LCP and anisotropy in mechanical strength occurs against the transverse direction (TD), therefore, it is difficult to obtain a practical LCP-based thin film having a thickness of 50 $\mu$m or less.

Wholly aromatic LCPs often require a processing temperature of over 300° C. excepting PET/POB copolyesters and polyesters obtained by copolymerization of different aromatic hydroxycarboxylic acids (for example, Vectra series), and heat-resistant wholly aromatic liquid crystalline polyesters having a temperature of deflection under load (TDUL) of over 250° C. sometimes require a further higher processing temperature of 350° C. or more, therefore, an expensive and specific molding machine is necessary.

As film forming methods from a wholly aromatic polyester which forms an optically anisotropic melt, an blown film forming method and a flat film forming method using a T die method are disclosed, for example, in JP-B Nos. 62-58378 and 63-33450 and the like. However, any of these methods needs a processing temperature of 340° C. or more, and lowering of the processing temperature is still required.

A wholly aromatic liquid crystalline polyester which has a molecular weight for sufficient mechanical strength and can be molded at a low temperature (320° C. or lower) is disclosed in JP-B No. 63-3888 and a semi-aromatic liquid crystalline polyester is disclosed in JP-A No. 61-102234 and the like. As film forming methods of the polyesters, a method for film forming at a high shear rate is described in JP-A No. 2-3430, a, film forming method using a ring die and the like is described in U.S. Pat. No. 4,975,312 and WO9015706. Any of them disclose a method for relaxing anisotropy of a liquid polyester by a special molding method, which has a limitation in film-thinning, and practical problems still remain. And also, cost performance should be further improved since a monomer having special chemical structure is used. JP-A No. 2-3430 describes melt strength as one of technical factors in film formation. This reference describes about an aromatic liquid crystalline polyester resin derived from only an aromatic hydroxycarboxylic acid unit, and the melt strength is described as a factor for producing a film at a high shear rate, and there is no suggestion regarding other aromatic liquid crystalline polyester resins.

Further, for lowering the melting point of an aromatic liquid crystalline polyester resin, for example, Brit. Polym. J. 154-162 (1980) describes a method for introducing a bent chain structure such as an aliphatic chain into the main chain, a method for introducing a substituent into an aromatic ring, a method for introducing m-orienting bent structure (isophthalic acid, resorcinol and the like), and a method for introducing crankshaft structure (e.g., 6-hydroxy-2-naphthoic acid, 2,6-dihydroxynaphthalene and the like). A wholly aromatic liquid crystalline polyester synthesized from an aromatic hydroxycarboxylic acid derivative introduced crankshaft structure is described in JP-B No. 63-3888, and put into practical use as a resin which can be molded at a processing temperature of 320° C. or lower. However, a monomer having crankshaft structure is expensive, therefore there have been developed aromatic polyesters obtained from an aromatic hydroxycarboxylic acid, an aromatic dicarboxylic acid and an aromatic diol utilizing m-orienting bent structure (isophthalic acid, resorcinol and the like) which is advantageous in raw material cost. For example, such aromatic polyesters are described in JP-B Nos. 47-47870 and 52-24467, JP-A No. 1-152123 and the like, however, processing temperatures thereof are 320° C. or more. JP-B No. 62-58378 describes that even if aromatic dicarboxylic acid components are all composed of isophthalic acid, the film forming temperature of T die is 360° C.

LCP resin-based film materials having high gas barrier properties and processability at a low temperature of 320° C. or lower still have a lot of problems for practical use.

Under such conditions, problems to be solved by the present invention, that is an object of the present invention is to provide a aromatic liquid crystalline polyester resin which has sufficient heat-resistance as a wrapping material and has improved low temperature processability, and can produce a film having excellent gas barrier property, and a resin composition thereof.

SUMMARY OF THE INVENTION

The aromatic liquid crystalline polyester resin of the present invention is obtained from an aromatic hydroxycarboxylic acid, an aromatic dicarboxylic acid and an aromatic diol, by optimizing formulation ratio of the above-described three components, which result a low temperature processable aromatic liquid crystalline polyester.

That is, the present invention relates to an aromatic liquid crystalline polyester resin comprising a copolymer containing an aromatic hydroxycarboxylic acid unit, an aromatic dicarboxylic acid unit and an aromatic diol unit, wherein the polyester resin contains the following repeating unit (A) in an amount of 30 mol % or more based on the total amount of repeating units, has a logarithmic viscosity of 1.5 dl/g or more, has a flow temperature of 300° C. or less, and exhibits a melt tension measured at a temperature higher than the flow temperature by 25° C. or more of 1.0 g or more,

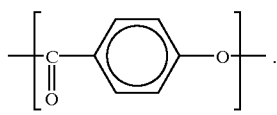

(A)

wherein, the flow temperature means a temperature (° C.) at which the melt viscosity measured by a capillary type rheometer is 48,000 poise when a resin which has been melted by heating at a temperature raising rate of 4° C./min is extruded through a nozzle having an internal diameter of 1 mm and a length of 10 mm under a load of 100 kgf/cm$^2$.

Further, the present invention relates to an aromatic liquid crystalline polyester resin composition comprising an aromatic liquid crystalline polyester ($\alpha$) as a continuous phase and a copolymer ($\beta$) having a reactive group with the aromatic liquid crystalline polyester as a dispersed phase, and said liquid crystalline polyester composition has a flow temperature of 300° C. or less, here the flow temperature means a temperature (° C.) at which the melt viscosity measured by a capillary type rheometer is 48,000 poise when a resin which has been melted by heating at a temperature raising rate of 4° C./min is extruded through a nozzle having an internal diameter of 1 mm and a length of 10 mm under a load of 100 kgf/cm$^2$.

The aromatic liquid crystalline polyester resin of the present invention is an aromatic liquid crystalline polyester resin comprising a copolymer containing an aromatic hydroxycarboxylic acid unit, an aromatic dicarboxylic acid unit and an aromatic diol unit, wherein the polyester resin contains the repeating unit (A) in an amount of 30 mol % or more based on the total amount of repeating units, has a logarithmic viscosity of 1.5 dl/g or more, has a flow temperature of 300° C. or less, and exhibits a melt tension measured at a temperature higher than the flow temperature by 25° C. or more of 1.0 g or more, and exhibits optically anisotropy (liquid crystallinity) in melting, excellent melt-moldability, chemical-resistance and mechanical property.

In the aromatic liquid crystalline polyester resin of the present invention, the amount of the repeating unit (A) of less than 30 mol % based on the total amount of repeating units constituting the polymer is not preferable since then liquid crystallinity is weak.

It is preferable from the view point of mechanical properties and molding property that the aromatic liquid crystalline polyester resin of the present invention has a logarithmic viscosity ($\eta$ inh) defined by the following formula of 1.5 dl/g or more, more preferably 2.0 dl/g or more, further preferably 2.5 dl/g or more. Further, it is preferable from the viewpoints of molding property and the like that the upper limit of $\eta$ inh is preferably 10 dl/g or less, more preferably 8 dl/g or less. When $\eta$ inh is 1.5 dl/g or less, film forming property and mechanical strength are problematical.

$\eta inh = (\ln(\eta rel))/C$

In the formula, $\eta$ rel is called relative viscosity and represents the ratio of falling time of a polymer solution to falling time of a solvent between given marked lines in a capillary. C represents the concentration of a polymer solution,.and unit thereof is g/dl. Viscosity is measured by an Ostwald viscometer using as a solvent 3,5-bis (trifluoromethyl) phenol at a polymer concentration of 0.1 g/dl and a temperature of 60° C.

In view of processability, $\eta$ inh is suitably 10 dl/g or less, more suitably 8 dl/g or less. When $\eta$ inh is lower than 1.5 dl/g, the molecular weight is low and problems of film forming property and mechanical strength may occur.

The aromatic liquid crystalline polyester resin of the present invention has a flow temperature of 300° C. or less, preferably from 230 to 295° C., further preferably from 240 to 290° C. A flow temperature of over 300° C. is not preferable since the film forming processing temperature may exceed 320° C.

The aromatic liquid crystalline polyester resin of the present invention exhibits a melt tension (hereinafter, sometimes abbreviated as "MT") measured at a temperature higher than the flow temperature by 25° C. or more of 1.0 g or more, preferably 2 g or more, further preferably 4 g or more, under conditions of an internal diameter of 2.1 mm and a length of 8 mm of a capillary and a piston rate of 5 mm/min. When the MT value is less than 1.0 g, frost line is often difficult to be kept stable, and blown film forming becomes. The MT value is preferably 30 g or less, and more preferably 25 g or less. The less of the temperature dependency of the MT value, the more preferable of the film forming property.

The aromatic liquid crystalline polyester resin of the present invention is preferably an aromatic liquid crystalline polyester resin comprising 30 to 80 mol %, more preferably 40 to 70 mol % of the following repeating unit (A), 10 to 35 mol %, more preferably 15 to 30 mol % of the following repeating unit (B) and 10 to 35 mol %, more preferably 15 to 30 mol % of the following repeating unit (C),

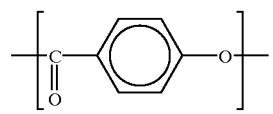

(A)

(B)

in the formula, Ar represents a divalent aromatic group,

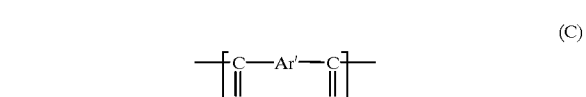

(C)

in the formula, ArI represents two or more selected from

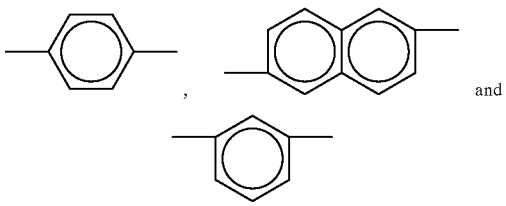

and and the content of

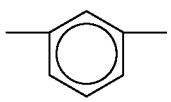

based on the total of ArIis 40–95 mole %.

The ratio of repeating unit (A) is preferably 80 mol % or less. When the ratio is more than 80 mol %, the aromatic liquid crystalline polyester resin may sometimes contains parts which are not melted by heating and accordingly melt-processability falls down, and when the ratio is less than 30 mol %, liquid crystallinity often becomes weak.

It is preferable that the ratio of the repeating unit (B) is from 10 to 35 mol % and the ratio of the repeating unit (C) is from 10 to 35mol % since the aromatic liquid crystalline polyester resin exhibits well-balanced physical properties.

Ar in the repeating unit (B) represents a divalent aromatic group, and preferably a group having 6 to 20 carbon atoms. More preferably, Ar includes:

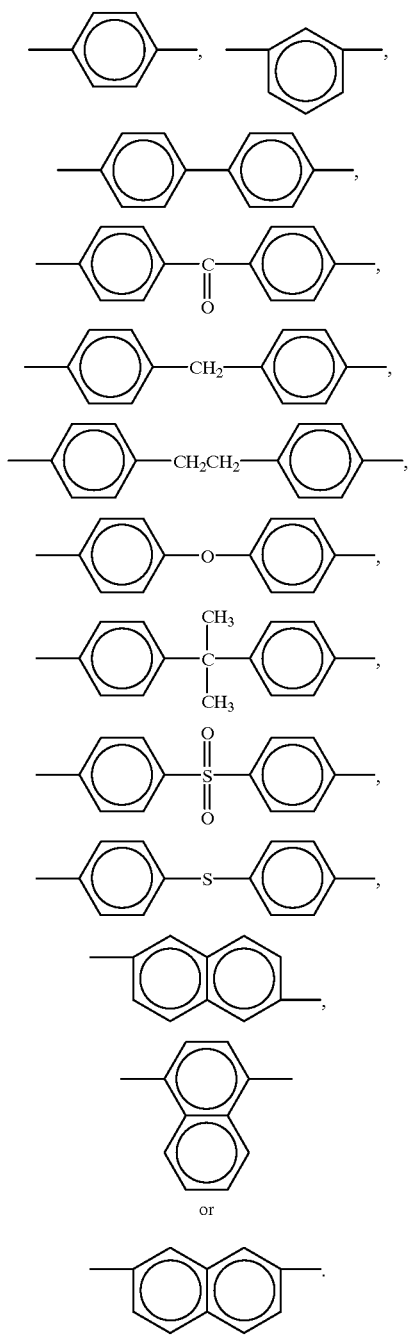

As the repeating unit (B), particularly preferable is the following repeating unit (B1).

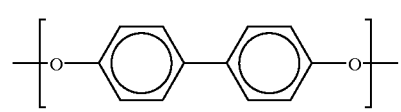

Ar' in the repeating unit (C) represents two or more selected from

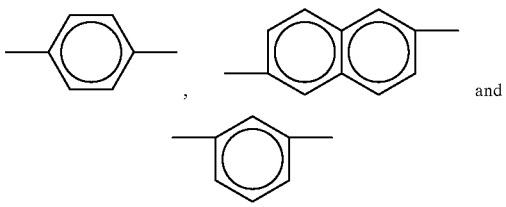

and and the content of

based on the total of Ar' is 40 to 95 mol %, more preferably 45 to 94 mol %, further preferably 48 to 92 mol %.

This ratio of less than 40 mol % is not preferable since then crystallinity may increases to make mold processing temperature higher. On the other hand, this ratio of over 95 mol % is not preferable since then treatment in the solid state polymerization may be difficult and film forming property may be low. The ratio of

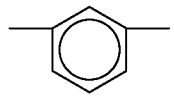

in Ar' in the repeating unit (C) of from 40 to 95 mol % is preferable from the standpoint of film forming property since then melt tension also increases. Further, in this case, molding (film forming) at a lower temperature becomes possible, and particularly it is also possible to obtain a thin film of 20 μm or less having oxygen barrier property and excellent water vapor barrier property.

It is particularly preferable that the repeating unit (C) is composed of 60 to 5 mol % of the following repeating unit (C1) and 40 to 95 mol % of the following repeating unit (C2). More preferably, the repeating unit (C) is composed of 55 to 6 mol % of the following repeating unit (C1) and 45 to 94 mol % of the following repeating unit (C2), further preferably, the repeating unit (C) is composed of 52 to 8 mol % of the following repeating unit (C1) and 48 to 92 mol % of the following repeating unit (C2).

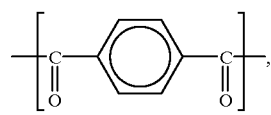

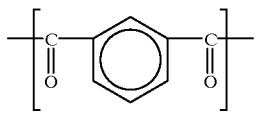
(C2)

In the aromatic liquid crystalline polyester resin of the present invention, the temperature dependency of melt viscosity is small, and molding processing temperature range tends to be wide. In the aromatic liquid crystalline polyester resin of the present invention, it is preferable that the ratio of the melt viscosity (η1) measured at a shear rate of 100 sec$^{-1}$ or 1000 sec$^{-1}$ at a temperature at which anisotropic melt phase begins to be formed (flow temperature) and the melt viscosity (η2) measured at the same shear rate as in η1 at a temperature higher than the flow temperature by 20° C. (η2/η1) is from 0.10 to 0.80 (more preferably from 0.20 to 0.70) and higher than that of a conventional aromatic liquid crystalline polyester resin (0.10 or less). In this aromatic liquid crystalline polyester resin of the present invention, it is believed that temperature dependency of melt viscosity is small and molding stability in processing is improved.

The aromatic liquid crystalline polyester resin of the present invention can be obtained, for example, by charging 30 to 80 mol % of a compound represented by the following formula (I), 10 to 35 mol % of a compound represented by the following formula (II) and 10 to 35 mol % of a compound represented by the following formula (III) into a reaction vessel, polycondensing the charged mixture at a temperature from 270 to 350° C. to produce an aromatic liquid crystalline polyester resin having a flow temperature of 210° C. or more and lower than the polycondensation reaction temperature by 30° C. or more, discharging the aromatic liquid crystalline polyester resin in a molten state which is the content of the reaction vessel and solidifying the resin, then, pulverizing the solidified resin into a particle having a particle size of 3 mm or less and treating the powder at a temperature from 200 to 310° C. still in the solid state under inert gas atmosphere for 1 to 24 hours, and granulating the product under heat-melted condition into a pellet:

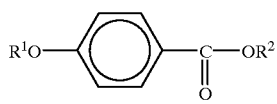
(I)

in the formula, R$^1$ represents a hydrogen atom, formyl group, acetyl group, propionyl group or benzoyl group, and R$^2$ represents a hydrogen atom, methyl group, ethyl group, propyl group, benzyl group or phenyl group, R$^3$O—Ar—OR$^3$ (II)

in the formula, Ar represents a divalent aromatic group, and R$^3$ represents a hydrogen atom, acetyl group, propionyl group or benzoyl group,

(III)

in the formula, Ar' represents two or more selected from

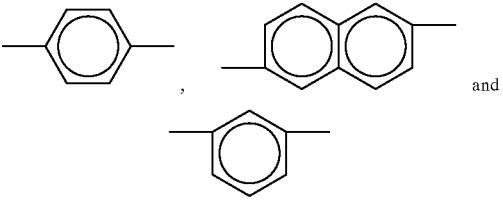
and and the content of

based on the total of Ar ' is 40–95 mole %,
and R$^4$ represents a hydrogen atom, methyl group, ethyl group, propyl group, benzyl group or phenyl group.

Examples of the compound represented by the above-described formula (I) include p-hydroxybenzoic acid, p-formyloxy benzoic acid, p-acetoxybenzoic acid, p-propionyloxy benzoic acid, methyl p-hydroxybenzoate, propyl p-hydroxybenzoate, phenyl p-hydroxybenzoate, benzyl p-hydroxybenzoate, methyl p-acetoxybenzoate, phenyl p-acetoxybenzoate and the like, and in particular, p-hydroxybenzoic acid or p-acetoxybenzoic acid is preferable.

In the present invention, m-hydroxybenzoic acid, m-formyloxy benzoic acid, m-acetoxybenzoic acid, m-propionyloxybenzoic acid, methyl m-hydroxybenzoate, propyl m-hydroxybenzoate, phenyl m-hydroxybenzoate, benzyl m-hydroxybenzoate, methyl m-acetoxybenzoate, 6-hydroxy-2-naphthoic acid, 6-acetoxy-2-naphthoic acid, methyl 6-hydroxy-2-naphthoate, phenyl 6-hydroxy-2-naphthoate, or methyl 6-hydroxy-2-naphthoate can be used together within the range which does not exert significant influence on physical properties and processability (film forming property) of the resulting aromatic liquid crystalline polyester resin.

Examples of the compound represented by the above-described formula (II) include 1,4-dihydroxybenzene, 1,3-dihydroxybenzene, 4,4'-dihydroxydiphenyl, 4,4'-dihydroxybenzophenone, 4,4'-dihydroxydiphenylmethane, 4,4-dihydroxydiphenylethane, 4,4'-dihydroxydiphenyl ether, 2,2'-bis(4-hydroxyphenyl)propane, 4,4'-dihydroxydiphenylsulfone, 4,4'-dihydroxydiphenylsulfide, 2,6-dihydroxynaphthalene, 1,4-dihydroxynaphthalene, 2,7-dihydroxynaphthalene, and compounds obtained by substituting dihydroxy on these compounds by diacetoxy, dipropionyloxy or dibenzoyloxy, and further, compounds obtained by nuclear substitution by an alkyl group such as a methyl group, a tert-butyl group and the like, and aryl group such as phenyl group and the like, an alkoxy group such as a methoxy group and the like, or a halogen atom such as a chlorine atom and the like. Preferable examples are selected from 1,4-dihydroxybenzene, 1,3-dihydroxybenzene, 4,4'-dihydroxydiphenyl, 4,4'-dihydroxydiphenyl ether, 2,6-dihydroxynaphthalene, 4,4'-dihydroxydiphenylmethane, and compounds obtained by substituting dihydroxy on these compounds by diacetoxy. Further preferable examples are selected from 1, 3-dihydroxybenzene, 4,4'-dihydroxydiphenyl, 4,4'-dihydroxydiphenyl ether, and compounds obtained by substituting dihydroxy on these compounds by diacetoxy, and 4,4'-dihydroxydiphenyl or 4,4'-diacetoxydiphenyl is particularly preferable.

The compounds represented by the above-described formula (III) are used in a mixture of two or more compounds differing at least in Ar' parts, and examples of such compounds include terephthalic acid, methyl terephthalate, ethyl terephthalate, propyl terephthalate, benzyl terephthalate, phenyl terephthalate, 2,6-dicarboxynaphthalene, 2,6-dimethyloxycarboxylnaphthalene, 2,6-diethyloxycarbonylnaphthalene, 2,6-dipropyloxycarbonylnaphthalene, 2,6-dibenzyloxycarbonylnaphthalene, 2,6-diphenyloxycarbonylnaphthalene, isophthalic acid, methyl isophthalate, ethyl isophthalate, propyl isophthalate, benzyl isophthalate and phenyl isophthalate. In the present invention, isophthalic acid, methyl isophthalate, ethyl isophthalate, propyl isophthalate, benzyl isophthalate or phenyl isophthalate among the above-described compounds exemplified for the formula (III) is used in an amount of 40 to 95 mol %, more preferably 45 to 94 mol %, further preferably 48 to 92 mol % based on the total amount of compounds represented by the formula (III) used.

As the compound represented by the formula (III), terephthalic acid, isophthalic acid and 2,6-dicarboxynaphthalene are preferable, and terephthalic acid and isophthalic acid are further preferable.

The molar ratio ((II): (III)) of a compound represented by the formula (II) to a compound represented by the formula (III) in charging is preferably (90 to 115):100, more preferably (100 to 110):100 from the viewpoints of polymer physical properties, particularly heat stability.

In producing the aromatic liquid crystalline polyester resin of the present invention, first, a mixture composed of compounds represented by the formulae (I), (II) and (III) is polycondensed in a reaction vessel, and each compound can be charged into the reaction vessel either all together or in portion. The reaction can be conducted under atmosphere of an inert gas, for example, nitrogen, at normal pressure, reduced pressure or combination thereof, and batch-wise process, continuous process or combination thereof can be adopted.

When a compound having a phenolic hydroxy group is used as the compound represented by the formula (I) or (II), it is preferable that a reaction which converts such a compound into a compound which is easily polycondensed (for example, esterification reaction using an acid anhydride such as acetic anhydride and the like) is conducted, prior to the polycondensation reaction, in a reaction vessel different from that used for the polycondensation reaction or in the same reaction vessel as that used for the polycondensation reaction, then, the polycondensation reaction is conducted subsequently. When a compound having a phenolic hydroxy group is used as the compound represented by the formula (I) or (II), it is more preferable that an acid anhydride such as acetic anhydride and the like in an amount of equivalent of more (preferably. 1.1 to 1.3-fold equivalent) of the phenolic hydroxy group is charged into a reaction vessel together with a mixture composed of the compounds represented by the formula (I), (II) and (III), esterification reaction is conducted, then, polycondensation reaction is conducted.

The temperature of the polycondensation reaction in the present invention is preferably from 270 to 350° C., and more preferably from 280 to 330° C. When the reaction temperature is lower than 270° C., progress of the reaction is slow, and when over 350° C., sub-reactions such as decomposition and the like tend to occur. Multi-stage reaction temperature may also be adopted, and if necessary, it is possible that an aromatic liquid crystalline polyester resin produced in the reaction is taken out in a molten state during the reaction or immediately after reaching to the maximum temperature.

While the polycondensation reaction usually progresses sufficiently even without using a catalyst, if necessary, compounds such as oxides, acetates and the like of Ge, Sn, Ti, Sb, Co, Mn and the like can be used as a catalyst. In the case of food wrapping films, removal of a catalyst component may be necessary, accordingly, non-catalyst method is preferable.

Known types of reaction vessels can be used for the polycondensation reaction. In the case of a vertical reaction vessel, multi-stage paddle blades, turbine blades, double helical blades are preferable, and in the case of a horizontal reaction vessel, those in which blades of various forms, for example, lens-shaped blades, glasses-shaped blades, multi-circular flat blades and the like are mounted perpendicular to single or twin stirring axes are advantageous.

Heating of the reaction vessel is conducted by heat medium, gas or electric heater, and it is preferable that stirring axis, blades, baffle plate and the like are also heated for uniform heating.

When the reaction vessel is multi-stage type or partitioned type, the reaction temperature of the last portion is referred to as the polycondensation temperature of the present invention. The time of the polycondensation reaction should be appropriately determined depending on the reaction conditions, and preferably it is from 0.5 to 5 hours at the above reaction temperature.

In the method for producing an aromatic liquid crystalline polyester resin, it is important that the flow temperature of an aromatic liquid crystalline polyester resin obtained by polycondensation reaction is 210° C. or more and lower than the polycondensation reaction temperature by 30° C. or more. Further preferably, it is preferable that the flow temperature of the resulting aromatic liquid crystalline polyester resin is 215° C. or more and lower than the polycondensation reaction temperature by 35° C. or more. When the flow temperature is less than 210° C., the molecular weight of an aromatic liquid crystalline polyester resin is not sufficient, and there are problems regarding molding processing and physical properties. Even if post treatments such as solid phase polymerization and the like are conducted, melt-adhesion of aromatic liquid crystalline polyester resins occurs and a large amount of by-products are produced, also leading to economical disadvantage. When the flow temperature is near the polycondensation reaction temperature, viscosity of a polyester increases and taking out thereof becomes difficult, and in addition, stirring and mixing property also deteriorates, and uneven heating may exerts reverse influence on heat-stability of the polymer. Further, from the industrial standpoint, continuous use of a polymerization vessel is advantageous since in batch-wise polymerization, washing of polymerization vessels increases cost, and melt-discharging conditions are particularly important. For washing reaction vessels, there are listed washing methods using glycols and/or amines suggested in JP-A Nos. 5-29592 and 5-29593 by the present applicant.

The aromatic liquid crystalline polyester resin is taken out in a molten state, preferably under atmosphere of an inert gas such as nitrogen in view of the color of the resulting polymer. However, it can be taken out in air when moisture content is low.

As the device for taking out the aromatic liquid crystalline polyester resin of the present invention in a molten state, known extruders, gear pumps are exemplified, and a valve may also be sufficient. Since the taken out resin is solidified after some while, then, the resin is cut by a strand cutter and a sheet cutter, and pulverized according to the object- For treating a large amount of the resin in a short time, there is exemplified a method in which the resin is passed through a constant feeding apparatus and cooled by a double belt cooler as described in JP-A No. 6-256485 by the present applicant.

In general industrial use excepting food field, a solvent, lubricant, stabilizer and additive can previously be added to the polycondensation system within the range which does not change melt viscosity significantly.

Though the aromatic liquid crystalline polyester resin taken out in a molten state may sometimes be used as it is, it is preferable to carry out solid phase polymerization to remove unreacted raw materials, to increase molecular weight and to improve physical properties.

It is preferable that the resulted aromatic liquid crystalline polyester resin is pulverized by a known grinder into a particle (powder) having an average particle size (according to Rosin-Rammlar method) of 3 mm or less, preferably 0.5 mm or less, further preferably from 0.1 to 0.4 mm, and solid phase polymerization is conducted by heat treatment under inert gas atmosphere with keeping the solid state of the particle.

When the particle size is 3 mm or more, the polymerization rate differs and the diffusion rate of by-products resulted from reaction of raw materials also differs between at surface layer and at inner portion, consequently molecular weight distribution becomes broad and removal of materials which should be removed becomes insufficient, therefore, foaming and gas generation sometimes occur.

It is necessary to select temperature raising rate and maximum treating temperature in the solid state polymerization so that aromatic liquid crystalline polyester particles are not melt-adhered. When melt-adhesion occurs, surface area decreases, and polycondensation reaction and removal of components having lower boiling point are delayed. Regarding the maximum treating temperature in the solid state polymerization without causing melt-adhesion, it is effective to conduct treatment at a temperature in the range from 200 to 310° C., more preferably from 230 to 300° C. under inert gas atmosphere. At a temperature outside the above range, the reaction is slow and treating time is uneconomically longer, and the treating temperature of 310° C. or more is not preferable since then powder particles are mutually melt-adhered or melted and solid phase condition can not be kept.

The inert gas is selected from nitrogen, helium, argon and carbon dioxide, and among them, nitrogen is preferable. When air, particularly oxygen is present, an aromatic liquid crystalline polyester is oxidized at a high temperature, and deterioration of physical properties and coloration tend to occur, therefore, the presence of oxygen is not preferable.

In the solid state polymerization, a known drier, reaction apparatus, mixer, electric furnace and the like can be used, and a gas-flow type closed furnace is preferable.

The form of the aromatic liquid crystalline polyester resin used in the present invention in usual molding processing is a powder or a pellet (granulated pellet) obtained after granulation of the resin in heat-melted condition by a twin screw extruder and the like, and a granulated pellet is more preferable.

The flow temperature (FT1) of a pellet after granulation of the aromatic liquid crystalline polyester resin of the present invention shows tendency to be lower than the flow temperature (FT0) in powder stage before granulation. This tendency is larger as compared with a conventional aromatic liquid crystalline polyester resin using solid phase polymerization method. The reason for this difference is believed to difference in crystallinity and the like due to difference of aromatic dicarboxylic acid composition ratio and solid phase polymerization conditions, however, details thereof are not clear. It is preferable that FT1 is lower than a temperature which is lower than FT0 by 10° C. and further preferably lower than a temperature which is lower than FT0 by 20° C., for lowering molding temperature of the aromatic liquid crystalline polyester resin and increasing molding processability.

For granulating an aromatic liquid crystalline polyester resin into a pellet under heat-melted condition, known methods can be applied. There is also a method in which a resin is fed in a molten state from a polymerization vessel to slotted parallel rollers, shaped into a strand (string), and the strand is cut by a strand cutter and the like. For granulating an aromatic liquid crystalline polyester resin powder to produce apellet, a resin is melted and kneaded using a single or twin screw extruder, cooled by air or if required cooled with water, then, the resin is shaped into a pellet by a pelletizer (strand cutter) usually used. Such a high kneading machine required for the reaction of a usual polymer alloy is not preferable because of degradation may occur due to heat generation by shearing. In conducting melt-kneading, the set temperature of a cylinder of a kneading apparatus (die head temperature) is preferably in the range from 200 to 350° C., more preferably from 230 to 330° C., further preferably from 240 to 320° C.

Moreover, the above-mentioned liquid crystalline polyester can be preferably used for a liquid crystalline polyester resin composition comprising this liquid crystalline polyester ($\alpha$) as continuous phase and a copolymer having a reactive group with the aromatic liquid crystalline polyester ($\beta$) as a dispersed phase. Here, the flow temperature of this liquid crystalline polyester resin composition is 300° C. or less.

Examples of functional groups reactive with liquid crystalline polyesters include epoxy group, oxazolyl group, amino group, and among them, epoxy group is preferable.

In the copolymer ($\beta$) of the present invention, method of introducing a functional group reactive with a liquid crystalline polyester into the copolymer is not particularly limited but a known method can be used. For example, it is possible to introduce a monomer having the functional group by copolymerization in a synthesis stage of the copolymer, or it is also possible to graft copolymerize a monomer having the functional group with the copolymer.

As an epoxy group, glycidyl group is exemplified preferably. As a monomer having glycidyl groups, unsaturated carboxylic acid glycidyl ester and unsaturated glycidyl ether can be used preferably.

Compounds having an unsaturated carboxylic acid glycidyl ester group or an unsaturated glycidyl ether group are represented by the below-mentioned general formulae (1) and (2):

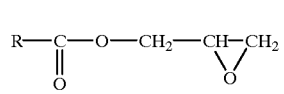
(1)

in the formula, R denotes a hydrocarbon group having 2 to 13 carbon atoms with an ethylene type unsaturated bond,

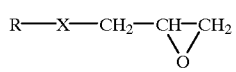

(2)

in the formula, R denotes a hydrocarbon group having 2 to 18 carbon atoms with an ethylene type unsaturated bond, and X denotes —CH2—O— or

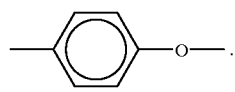

Examples of unsaturated carboxylic acid glycidyl ester include glycidyl acrylate, glycidyl methacrylate, itaconic acid diglycidyl ester, butene tricarboxylic acid triglycidyl ester and p-styrene carboxylic acid glycidyl ester.

Examples of unsaturated glycidyl ether include vinyl glycidyl ether and allyl glycidyl ether.

The above copolymer having a reactive group with the aromatic liquid crystalline polyester (β), is a copolymer which contains preferably 0.1 to 30% by weight of unsaturated glycidyl carboxylate unit and/or unsaturated glycidyl ether unit.

Moreover, the above copolymer having a reactive group with the aromatic liquid crystalline polyester (β) may be either rubber or thermoplastic resin, and also maybe a mixture of thermoplastic resin and rubber. When rubber is used, mold processing property and flexibility of the composition are excellent, and it is preferable.

The copolymer (β) of the present invention has preferably a heat of fusion of less than 3J/g.

Mooney viscosity of the copolymer (β) is suitably 3 to 70, more suitably 3 to 30, further suitably 4 to 25. The "Mooney viscosity" herein denotes a value measured by a 100° C., large rotor according to the JIS K6300.

A "rubber" herein corresponds to a polymer having rubber elasticity in a room temperature disclosed in the new edition polymer dictionary (compiled by the Polymer Society, published in 1988 by Asakura Shoten). Examples thereof include natural rubber, butadiene polymer, butadiene-styrene copolymer (including random copolymer, block copolymer (including SEBS rubber and SBS rubber), and graft copolymer), or hydrogenated products thereof, isoprene polymer, chlorobutadiene polymer, butadiene-acrylonitrile copolymer, isobutylene polymer, isobutylene-butadiene copolymer, isobutylene-isoprene copolymer, acrylate-ethylene containing copolymer rubber, ethylene-propylene copolymer rubber, ethylene-butene copolymer rubber, ethylene-propylene-styrene copolymer rubber, styrene-isoprene copolymer rubber, styrene-butylene copolymer, styrene-ethylene-propylene copolymer rubber, perfluorinated rubber, fluorinated rubber, chloroprene rubber, butyl rubber, silicone rubber, ethylene-propylene-nonconjugated diene copolymer rubber, thiol rubber, polysulfide rubber, polyurethane rubber, polyether rubber (such as polypropylene oxide), epichlorohydrin rubber, polyester elastomer, and polyamide elastomer. Among these examples, acrylate-ethylene copolymer is preferable, and (meth)acrylate-ethylene copolymer rubber is further preferable.

These rubber-like materials can be produced in any production method such as an emulsion polymerization method and a solution polymerization method, with any catalyst such as trialkylaluminum, lithium halide and nickel containing catalyst.

Copolymers (β) of the present invention include the above-mentioned rubbers, having a functional group reactive with a liquid crystalline polyester (A).

That is, preferable examples of rubbers having a functional group reactive with a liquid crystalline polyester (β) of the present invention include (meth)acrylate-ethylene-unsaturated carboxylic acid glycidyl ester and/or unsaturated glycidyl ether copolymer rubber.

Here, the (metha)acrylate is an ester obtained from an acrylic acid or methacrylic acid, and an alcohol. As the alcohol, an alcohol having 1–8 carbon atoms is preferable. As the (metha)acrylate, methyl acrylate, methyl methacrylate, n-butylacrylate, n-butylmethacrylate, tert-butylacrylate, tert-butyl methacrylate, 2-ethylhexyl acrylate, and 2-ethylhexyl methacrylate are preferable. These (metha) acrylates can be used alone or in combination of two or more.

Component ratio of the above-mentioned (meth)acrylate-ethylene-unsaturated carboxylic acid glycidyl ester and/or unsaturated glycidyl ether copolymer rubber is preferably more than 40 but less than 97 weight %, more preferably 45 to 70 weight % of (meth)acrylate, preferably more than 3 but less than 50 weight %, more preferably 10 to 49 weight % of an ethylene unit, and preferably more than 0.1 but less than 30 weight %, more preferably 0.5 to 20 weight % of an unsaturated carboxylic acid glycidyl ester and/or unsaturated glycidyl ether unit.

When the component ratio is outside above range, thermal stability and/or mechanical properties of the article such as a film and sheet, become inferior sometimes, and it is not preferable.

The above copolymer rubber can be produced in an ordinary method, such as bulk polymerization, emulsion polymerization and solution polymerization with a free radical initiator. An representative polymerization method is disclosed in the JP-B No. 46-45085 and JP-B-61-127709. That is, production can be conducted in the conditions of a 500 kg/cm² or more pressure, 40 to 300° C. temperature in the presence of a polymerization initiator capable of generating a free radical.

Other examples of the rubber which can be used as a copolymer (β) of the present invention include an acryl rubber having a functional group, and a block copolymer rubber of vinyl aromatic hydrocarbon compound-conjugation diene compound which has a functional group reactive with a liquid crystalline polyester.

The acrylic rubber mainly comprises at least one selected from the group consisting of the monomers represented by the below-mentioned general formulae (3) to (5):

(3)

wherein $R^1$ denotes an alkyl group or a cyano alkyl group having 1 to 18 carbon atoms, and R' denotes a hydrogen atom or a methyl group;

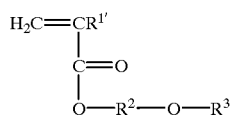

(4)

wherein $R^2$ denotes an alkylene group having 1 to 12 carbon atoms, and $R^3$ denotes an alkyl group having 1 to 12 carbon atoms; and

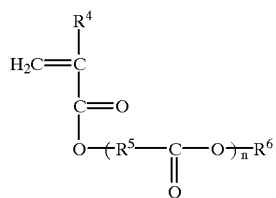

(5)

wherein $R^4$ denotes a hydrogen atom or a methyl group, $R^5$ denotes an alkylene group having 3 to 30 carbon atoms, $R^6$ denotes an alkyl group having 1 to 20 carbon atoms or a derivative thereof, and n denotes an integer from 1 to 20.

Examples of alkyl acrylates represented by the above-mentioned general formula (3) include methyl acrylate, ethyl acrylate, propyl acrylate, butyl acrylate, pentyl acrylate, hexyl acrylate, actyl acrylate, 2-ethyl hexyl acrylate, nonyl acryalte, decyl acrylate, dodecyl acrylate and cyano ethyl acrylate.

Examples of alkoxyalkyl acrylates represented by the above-menitoned general formula (4) include methoxy ethyl acrylate, ethoxy ethyl acrylate, butoxy ethyl acrylate and ethoxy propyl acrylate. One kind or two ormore kinds thereof can be used as a main component of the acrylic rubber.

As a component of the acrylic rubber, an unsaturated monomer copolymerizable with at least one selected from the compounds represented by the above-mentioned general formulae (3) to (5) as needed.

Examples of the unsaturated monomers include styrene, α-methyl styrene, acrylonitril, styrene halide, methacrylonitrile, acryl amide, methacryl amide, vinylnaphthalene, N-methylol acryl amide, vinyl acetate, vinyl chloride, vinylidene chloride, benzyl acrylate, methacrylic acid, itaconic acid, fumaric acid and maleic acid.

Suitable ratio of acryl rubber having a functional group with liquid crystalline polyester is 40.0–99.9% by weight of monomer selected at least one from the compound represented by the above general formula (3)–(5), 0.1–30.0% by weight of unsaturated glycidyl carboxylate and/or unsaturated glycidyl ether, and 0.0–30.0% by weight of unsaturated monomer which can copolymerize.with the monomer selected at least one from the compound represented by the above general formula (3)–(5), If the components ratio of this acryl rubber is within the above range, the heat resistance, impact resistance, and mold processing property of the composition are good, and it is preferable.

As the production method of the acryl rubber, known polymerization methods such as emulsion polymerization, suspension polymerization, solution polymerization, or bulk polymerization in existence of radical initiator can be used, which are described, for example, in JP-A-59-113010, JP-A-62-64809, JP-A-3-160008, or WO 95/04764.

As the vinyl aromatic hydrocarbon compound/conjugated diene compound block copolymer rubber having epoxy group reactive with the liquid crystalline polyester include a rubber obtainable by epoxydating a block copolymer comprising sequences of a vinyl aromatic hydrocarbon compound (a) and sequences of a conjugated diene compound (b), and hydrogenated ruber of the above block copolymer.

The vinyl aromatic hydrocarbon compound/ block copolymer and its hydrogenated product can be prepared by conventional method, for example, as described in JP-B-40-23798 and JP-A-59-133203.

Vinyl aromatic hydrocarbon compounds include styrene, vinyl toluene, divinyl benzene, a-methylstyrene, p-methylstyrene and vinylnaphthalene. Among them, styrene is preferable.

Conjugated diene compounds include butadiene, isoprene, piperylene, 1,3-pentadiene and 3-butyl-1,3-octadiene. Among them, butadiene and isoprene are preferable.

As the rubber used as a copolymer (β), a copolymer rubber of (metha)acrylate-ethylene-(unsaturated glycidyl carboxylate and/or unsaturated glycidyl ether) is used preferably.

The rubber can be vulcanized as needed, and can be used as a vulcanized rubber. Vulcanization can be achieved by the use of a polyfunctional organic acid, a polyfunctional amine compound, or an imidazole compound. But vulcanization methods are not limited thereto.

Examples of the thermoplastic resin having an epoxy group, as a concrete example of a copolymer having a reactive group with the aromatic liquid crystalline polyester (β), include epoxy group containing ethylene copolymer comprising:

(a) 50–99% by weight of ethylene unit, (b) 0.1–30% by weight, preferably 0.5 to 20% by weight of unsaturated glycidyl carboxylate unit and/or unsaturated glycidyl ether unit, (c) 0–50% by weight of ethylenically unsaturated ester compound unit.

Examples of the ethylenically unsaturated ester compound (c) include: vinyl ester of carboxylic acid, such as vinyl acetate, vinyl propionate; and alkyl ester of α, β-unsaturated carboxylic acid such as methyl acrylate, ethyl acrylate, butyl acrylate, methyl methacrylate, ethyl methacrylate, and butyl methacrylate. Among them, vinyl acetate, methyl acrylate and ethyl acrylate are preferable.

Concrete examples of the epoxy group containing ethylene copolymer include: a copolymer which consists of ethylene unit and glycidyl methacrylate unit; a copolymer which consists of ethylene unit, glycidyl methacrylate unit, and methyl acrylate unit; a copolymer which consists of ethylene unit, glycidyl methacrylate unit, and ethyl acrylate unit; and a copolymer which consists of ethylene unit, glycidyl methacrylate unit, and vinyl acetate unit.

Melt index of the epoxy group containing ethylene copolymer (hereinafter may be called MFR; JIS K6760, 190° C., 2.16 kg load) is suitably 0.5–100 g/10 min., and more suitably 2–50 g/10 min., in view of mechanical physical properties of the composition, and the compatibility with liquid crystalline.

As the epoxy group containing ethylene copolymer, stiffness modulusispreferably intherangeof 10–1300 kg/cm², and more 20–1100 kg/cm². When the stiffness modulus is outside this range, processing property or mechanical properties of the composition sometimes become insufficient.

The epoxy group containing ethylene copolymer is prepared usually by high pressure radical polymerization method of copolymerizing an unsaturated epoxy compound and ethylene using a radical generating agent, at 500 to 4000 atmospheric pressure, and 100–300 ° C., under existence or un-existence of suitable solvent and chain transfer agent. Moreover, it can be prepared also by the method of mixing unsaturated epoxy compound and radical generating agent in polyethylene, and carrying out molten graft copolymerization in extruder.

The liquid crystalline polyester resin composition of the present invention comprises the above liquid crystalline polyester ($\alpha$) and the above copolymer ($\beta$), where the liquid crystalline polyester ($\alpha$) is a continuous phase and the copolymer having a reactive group with the aromatic liquid crystalline polyester ($\beta$) is a dispersed phase.

When liquid crystalline polyester is not continuous phase, the gas barrier property, heat resistance, etc. of the film may fall remarkably, and it is not preferable.

In the resin composition comprising a copolymer having a functional group and a liquid crystalline polyester although details of mechanism are unknown, it can be considered that a reaction occurs between components ($\alpha$) and ($\beta$) of the composition, while the component ($\alpha$) forms continuous phase, and the component ($\beta$) minutely disperses, and thus, the mold processing property of the composition is improved.

In the liquid crystalline polyester resin composition of the present invention, the flow temperature is 300° C. or less, preferably 220–295° C., and more preferably 230–280° C. When the flow temperature exceeds 300° C., film forming processing temperature may sometimes exceed 310° C., and it is not preferable.

The liquid crystalline polyester resin composition of the present invention comprises a liquid crystalline polyester a) 56.0–99.9% by weight, preferably 65–98% by weight, and more preferably 70–98% by weight, and a copolymer having a reactive group with the aromatic liquid crystalline polyester ($\beta$) 44.0–0.1% by weight, preferably 35–2% by weight, and more preferably 30–2% by weight.

When the component ($\alpha$) is less than 56.0% by weight, the gas barrier property and heat resistance of molded articles, such as film or sheet obtained from this composition may become inferior, and it is not preferable. When the component ($\alpha$) exceeds 99.9% by weight, the mold processing property of the composition may fall down, and moreover, it becomes expensive in price, and it is not preferable.

When the flow temperature (FT2) of the liquid crystalline polyester resin composition of the present invention is higher than the temperature which is 20° C. lower than the flow temperature (FT1) of liquid crystalline polyester of component ($\alpha$) of this composition, the mold processing property of the composition is improved, and it is preferable. It is more suitable that FT2 is higher than the temperature which is 10° C. lower than FT1. It is still suitable that FT2 is higher than FT1.

In the liquid crystalline polyester resin composition of the present invention, the temperature dependency of melt viscosity is small, and the mold processing temperature range is wide. In the aromatic liquid crystalline polyester resin composition of the present invention, wherein the ratio of the melt viscosity ($\eta 1$) measured at a shear rate of 100 sec$^{-1}$ or 1000 sec$^{-1}$ at the flow temperature and the melt viscosity ($\eta 2$) measured at the same shear rate as in $\eta 1$ at a temperature higher than the flow temperature by 20° C. ($\eta 2/\eta 1$) is from 0.20 to 0.80, preferably 0.30 to 0.80, and more preferably 0.40 to 0.80. The ratio shows larger value than those of conventional liquid crystalline polyesters. The resin composition of the present invention using such a liquid crystalline polyester has a small temperature dependency of melt viscosity, and the molding stability is thought to becomes good.

In the liquid crystalline polyester resin composition of the present invention, it is suitable that the melt tension (MT) measured at a temperature of higher by 25° C. or more than the flow temperature is 1.5 g or more, more preferably 2 g or more, and further preferably 5 g or more. Although it is dependent also on the composition of the liquid crystalline polyester resin composition, when MT is less than 1.5 g, blow film forming may become difficult, or frost line may not be stabilized.

As the method of manufacturing the liquid crystalline polyester resin composition of the present invention, known methods can be used. For example, each component is mixed in a solution state, and then evaporation of the solvent or precipitation is carried out. From industrial standpoint, method of mixing each component in molten state is preferable. For melt-kneading, kneading devices, such as currently generally used single screw or twin-screw extruder, and various kneaders can be used. Twin-screw high kneading machine is especially.

In case of melt-kneading, cylinder setting temperature of kneading device is suitably 200–350° C., more suitably 230–330° C., and further suitably 230–310° C.

In case of kneading, each component may be mixed uniformly beforehand, by a tumbling mixer or a Henschel mixer, and if necessary, each component can be fed separately and quantitatively into a kneader.

An inorganic filler can be optionally added to the aromatic liquid crystalline polyester resin used in the present invention. Examples of such inorganic filler include calcium carbonate, talc, clay, silica, magnesium carbonate, barium sulfate, titanium oxide, alumina, gypsum, glass flake, glass fiber, carbon fiber, alumina fiber, silica alumina fiber, aluminum borate whisker, potassium titanate fiber and the like.

If necessary, various additives such as an organic filler, antioxidant, heat stabilizer, optical stabilizer, flame retardant, lubricant, antistatic agent, inorganic or organic coloring agent, preservative, crosslinking agent, foaming agent, fluorescent agent, surface smoothing agent, surface gloss improver, releasing improver like a fluorine resin, and the like can be further added, during production process or in the later processing process, to the aromatic liquid crystalline polyester resin used in the present invention.

Formation of a film made of an aromatic liquid crystalline polyester resin in the present invention is not particularly restricted and can be conducted easily by a well-known method. For example, a film can be obtained by a T die method in which a melted resin is extruded through a T die and wound, or an blown film forming method in which a melted resin is extruded in cylindrical form through an extruder equipped with a annular dice, cooled, and wound, or a film can also be obtained by further drawing uniaxially a sheet obtained by an injection molding method or an extrusion method.

As a further suitable molding (film forming) method of the aromatic liquid crystalline polyester resin film, an blown film forming method is listed. Namely, the aromatic liquid crystalline polyester resin is fed to a melt-kneading extruder equipped with a die having annular slit, and melt-kneading is conducted at a cylinder set temperature of 200 to 320° C., preferably 210 to 310° C., further preferably 220 to 310° C. to extrude a cylindrical film upward or downward through the annular slit of the extruder. The clearance of the annular slit is from 0.1 to 5 mm, preferably from 0.2 to 2 mm, and the diameter of the annular slit is usually from 20 to 1000 mm, preferably from 25 to 600 mm.

Draft is applied to the melt extruded cylindrical melted resin film in longitudinal direction (MD), and at the same time, the film is expanded in transverse direction (TD) which is perpendicular to the longitudinal direction by blowing air or inert gas, for example, a nitrogen gas from inside of this cylindrical film.

In the blown film forming of an aromatic liquid crystalline polyester resin in the present invention, preferable TD drawing magnification, namely, blow ratio is from 1.5 to 15, and further preferably from 2.5 to 15. Preferable MD drawing magnification, namely, draw ratio is from 1.5 to 40, and further preferably from 2.5 to 30. Wherein, the blow ratio is (diameter of a cylindrical film)/(diameter of a dice), and the draw ratio if (surface area of an annular slit)/(sectional area of a film). When setting conditions in blown film forming are out of the above-described ranges, it is difficult to obtain and aromatic liquid crystalline polyester resin film which has uniform thickness, has no wrinkle and has suitable strength.

The circumference of the expanded film is usually cooled air or inert gas, for example, a nitrogen gas and the like, then, taken up through nip rolls. In blown film molding, such conditions can be selected that a cylindrical melted film is expanded to obtain a cylinder having uniform thickness and having smooth surface, depending on the composition of the aromatic liquid crystalline polyester resin.

The thickness of an aromatic liquid crystalline polyester resin layer in the present invention is not particularly restricted, and preferably from 1 to 500 μm, futher preferably from 1 to 200 μm.

EXAMPLES

The present invention will be further illustrated by examples, but the scoped of the present invention is not limited thereto. Physical properties were measured by methods shown below.

Flow temperature (FT): It is a index showing melt-flowability, and represents a temperature (° C.) at which the melt viscosity measured by a capillary type rheometer (for example, Koka Flow Tester CFT-500 manufactured by Shimadzu Corp.) is 48,000 poise when a sample resin (about 2 g) which has been melted by heating at a temperature raising rate of 4° C./min is extruded through a nozzle having an internal diameter of 1 mm and a length of 10 mm under a load of 100 kgf/cm$^2$.

Transition temperature to liquid crystal: It was given by endothermic peaks when heat behavior of a sample was measured using a differential type thermobalance (TAS-200 manufactured by Rigaku Co., Ltd.) under nitrogen flow at 70 ml/min with raising temperature at a rate of 10° C./min.

Regarding weight reduction, about 20 mg of a sample resin having a particle size of 250 μm or less was heated at a temperature raising rate of 10° C./min in nitrogen atmosphere and weight change up to 400° C. was measured using a differential type thermobalance (TAS-200 manufactured by Rigaku K.K.), and weight reduction ratio (%) was calculated based on the original weight.

Optical anisotropy: Optical anisotropy of a sample resin in a molten state was given by heating a sample resin powder having a particle size of 250 μm or less placed on a heating stage at a rate of 25° C./min under polarized light and observing visually or recording the amount of transmitted light by an XY recorder.

Melt viscosity: About 10 g of a sample was charged into Capirograph 1B (manufacturedbyToyo Seiki Seisaku-sho, Ltd.) using a capillary having an internal diameter of 0.5 mm and a length of 10 mm, and melt-viscosity was measured at temperature with a given shear rate (100 sec$^{-1}$, 1000 sec$^{-1}$)

Melt tension: About 10 g of a sample was charged into Capirograph 1B (manufactured by Toyo Seiki Seisaku-sho, Ltd.) and the sample was taken up in string form using a capillary having an internal diameter of 2.095 mm and a length of 8.0 mm at an extruding rate of a piston of 5.0 mm/min with raising winding speed automatically by a speed changeable winding machine, and tension at break was measured.

Oxygen gas permeability: It was measured according to JIS K7126 A (differential pressure method) at a temperature of 20° C. The unit is cc/m$^2$·24 hr·1 atm.

Water vapor permeability: Its was measured according to JIS Z0208 (cup method) at a temperature of 40° C. and a relative humidity of 90%. The unit is cc/m$^2$·24 hr·1 atm.

The oxygen gas permeability and the water vapor permeability were calculated in terms of a film thickness of 25 μm.

Light transmittance of a film: Transmittance (%) was measured using a U-3500 type auto-recording spectrophotometer manufactured by Hitachi Ltd.

Tensile strength of a film: Measurement was conducted according to JIS K7127 (tensile test method of plastic film and sheet) using a dumbbell type sample piece at a sample number of 5 and a test speed of 5 mm/min.

Film appearance was evaluated with eye observation.

○: Film has uniform thickness, and no protruding portion of insufficient melting is observed.

X: Film has un-uniform thickness, and protruding portion of insufficient melting is observed.

Logarithmic viscosity is calculated by the following formula.

$$\eta inh=(\ln(\eta rel))/C$$

In the formula, a rel is called relative viscosity and represents the ratio of falling time of a polymer solution to falling time of a solvent between given marked lines in a capillary. C represents the concentration of a polymer solution, and-unit thereof is g/dl. The viscosity is measured by an Ostwald viscometer using as a solvent 3,5-bis (trifluoromethyl) phenol at a polymer concentration of 0.1 g/dl and a temperature of 60° C.

Example 1

(1) Melt-polymerization

A 3 liter four-necked separable flask carrying a Y-shaped adaptor equipped with a Dimroth condenser, a nitrogen introducing tube and a thermocouple for measuring inner temperature, an having an anchor shape stirring blade and having a thermocouple also outside the flask was used, into this polymerization vessel were charged 979.8 g (7.09 mol) of p-hydroxybenzoic acid (POB), 440.3 g (2.36 mol) of 4,41-dihydroxybiphenyl (DOD), 117.9 g (0.71 mol) of terephthalic acid (TPA), 275.0 g (1.66 mol) of isophthalic acid (IPA) and 1328 g (13.0 mol) of acetic anhydride, and the outer temperature of the flask was raised to 150° C. with a mantle heater under nitrogen flow, and acetylation reaction was conducted for about 3 hours under reflux with stirring at 200 rpm. Following the acetylation reaction, the temperature was raised at a rate of 1° C./min and kept at 320° C. for about 2 hours to conduct melt-polycondensation. During this procedure, acetic acid by-produced by the polycondensation reaction was being removed continuously. On the way of the polymerization, sampling was conducted at 1 hour, and the flow temperature was measured to find it was 223° C. After about 2 hours, the stirring was terminated, and the polymer could be easily taken out in a molten state and there was little adhesion to the polymerization vessel and the stirring blade. The resulted polyester was solidified in a meanwhile. The yield was 1595 g (99.7% based on theoretical yield).

The same procedure was repeated three times, and the resulted polyester was cut into about 3 to 5 cm squares, then, pulverized into a particle having an average particle size of 1 mm or less using a grinding machine, then, the flow temperature (FT) was measured to find it was 228° C. This polymer (prepolymer) exhibited optically anisotropic melt.

(2) Solid Phase Polymerization

This prepolymer was placed on an aluminum tray which was charged into a furnace in nitrogen atmosphere, heated from room temperature to 200° C. over 1 hour under nitrogen atmosphere, and further heated up to 250° C. over 8.5 hours and kept for 5 hours, then, cooledandtaken out to obtain apolymer of an aromatic liquid crystalline polyester resin having a FT of 289° C. (advanced polymer). In this stage, weight reduction was 1.3%.

(3) Granulation

The resulted advanced polymer was melt-kneaded by a PCM-30 twin screw extruder manufacture by Ikegai Co., Ltd. at a die head temperature of 310° C. and a screw rotation of 80 rpm to obtain an aromatic liquid crystalline polyester resin pellet having a FT of 256° C. The melt tension of this resin pellet at 291° C. (FT+35° C.) was 1.6 g, and the logarithmic viscosity (η inh) measured at 60° C. was 2.53 dl/g. The melt-viscosity is shown in Table 1.

(4) Blown Film Formation

The resulted aromatic liquid crystalline polyester resin pellet was made into a film using a Labo Plasto mill (manufactured by Toyo Seiki Seisaku-sho Ltd.) to which a twin screw extruder having a diameter of 30 mm φ was installed and onto head portion of which a tublar die having a diameter of 25 mm φ and a die gap of 0.75 mm was mounted, at a cylinder temperature of 275° C., a die head temperature of 276° C. and a winding speed of 40 m/min, to obtain a film having a folding width of 150 mm. The stability of the film-forming process was good, the film thickness was 19 to 23 μm, and the film appearance of the filmwas excellent and no protruding portion was observed.

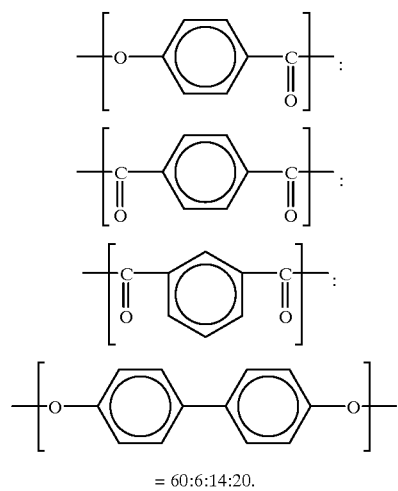

= 60:6:14:20.

Example 2

(1) Melt-polymerization

According to the same procedure as in Example 1(1) except that the total amount of terephthalic acid (TPA) and isophthalic acid (IPA) was kept constant at 2.36 mol and the component ratio was changed to TPA/IPA=10/90, with maintaining 979.8 g (7.09mol) of p-hydroxybenzoic acid (POB), 440.3 g (2.36 mol) of 4,4'-dihydroxybiphenyl (DOD) and 1328 g (13.0 mol) of acetic anhydride, melt-polymerization was conducted at 320° C. for 2 hours, the stirring was terminated, and the polymer could be easily taken out in a molten state and there was little adhesion to the polymerization vessel and the stirring blade. This polymer had a FT of 220° C. and exhibited optically anisotropic melt. The yield of the resulted polyester was 1592 g (99.5% based on theoretical yield).

(2) Solid Phase Polymerization

The same solid phase polymerization was conducted as in Example 1(2) except that "raising temperature up to 250° C. over 8.5 hours" was changed to "raising temperature up to 260° C. over 10 hours" to obtain an aromatic liquid crystalline polyester resin having a FT of 283° C. (advanced polymer). In this stage, weight reduction was 1.3%.

(3) Granulation

The resulted advanced polymer was melt-kneaded by a PCM-30 twin screw extruder manufacture by Ikegai Co., Ltd. at a die head temperature of 293° C. and a screw rotation of 80 rpm to obtain an aromatic liquid crystalline polyester resin pellet having a FT of 245° C. The melt tension of this resin pellet at 295° C. (FT+50° C.) was 1.4 g. The melt-viscosity is shown in Table 1.

(4) Blown Film Formation

The resulted aromatic liquid crystalline polyester resin pellet was made into a film according to the same manner as in Example 1(4), at a cylinder temperature of 285° C., a die head temperature of 285° C. and a winding speed of 10 m/min, to obtain a film having a folding width of 150 mm. The film forming was conducted stably, the film thickness was 30 to 35 μm, and appearance of the film was excellent and no protruding portion of insufficient melt was observed.

Example 3

(1) Melt-polymerization

According to the same procedure as in Example 1(1) except that the total amount of terephthalic acid (TPA) and isophthalic acid (IPA) was kept constant at 2.36 mol and the component ratio was changed to TPA/IPA=50/50, with maintaining 979.8 g (7.09mol) of p-hydroxybenzoic acid (POB), 440.3 g (2.36 mol) of 4,4'-dihydroxybiphenyl (DOD) and 1328 g (13.0 mol) of acetic anhydride, melt-polymerization was conducted at 320° C. for 2 hours, the stirring was terminated, and the polymer could be easily taken out in a molten state and there was little adhesion to the polymerization vessel and the stirring blade. This polymer had a FT of 224° C. and exhibited optically anisotropic melt. The yield of the resulted polyester was 1590 g (99.4% based on theoretical yield).

(2) Solid phase polymerization

The same solid phase polymerization was conducted as in Example 1(2) except that "raising temperature up to 250° C. over 8.5 hours" was changed to "raising temperature up to 260° C. over 10 hours" to obtain an aromatic liquid crystalline polyester resin having a FT of 299° C. (advanced polymer). In this stage, weight reduction was 1.4%.

(3) Granulation

The resulted advanced polymer was melt-kneaded by a PCM-30 twin screw extruder manufacture by Ikegai Co., Ltd. at a die head temperature of 310° C. and a screw rotation of 80 rpm to obtain an aromatic liquid crystalline polyester resin pellet having a FT of 279° C. The melt tension of this resin pellet at 309° C. (FT+30° C.) was 1.9 g. The melt-viscosity is shown in Table 1.

(4) Blown Film Formation

The resulted aromatic liquid crystalline polyester resin pellet was made into a film according to the same manner as in Example 1(4), at a cylinder temperature of 310° C., a die head temperature of 310° C. and a winding speed of 15 m/min, to obtain a film having a folding width of 150 mm. The bubble was stable, the film thickness was 25 to 30 μm, and the film appearance was excellent and no protruding portion of insufficient melt was observed.

Example 4

(1) Melt-polymerization

Into a 50 L SUS polymerization vessel having an anchor shape stirring blade in which the clearance between the wall of the polymerization vessel and the stirring blade was small were charged 20.45 g (113.5 mol) of p-acetoxybenzoic acid, 1.89 g (11.4 mol) of terephthalic acid, 4.40 g (26.5 mol) of isophthalic acid and 10.22 kg (37.8 mol) of 4,4'-diacetoxydiphenyl, and the vessel was heated by an oil circulation heat medium apparatus under nitrogen flow, when the temperature of the heat medium reached 150° C., heated gradually at about 0.7° C./min to about 300° C., during this procedure, acetic acid by-produced by the polycondensation reaction was being removed continuously. The temperature of the heat medium was kept at 300 to 310° C., and then, sampling was conducted at 1 hour, and the flow temperature was measured to find it was 235° C. After further reaction for 1 hour, then, the stirring was terminated. The polymer could be easily taken out in a molten state and there was little adhesion to the polymerization vessel and the stirring blade. The resulted polyester had a FT of 236° C., and the yield was 20.6 kg (98.1% based on theoretical yield), and endothermic peak accompanying liquid crystal transition was shown at a temperature of 265° C. or more.

(2) Solid Phase Polymerization

The resulted polymer was pulverized by an ordinary crude grinding machine and a fine grinding machine to obtain a particle of 1.0 mm or less. This was treated in a furnace in nitrogen atmosphere for 5 hours at a final treating temperature of 260° C. under nitrogen gas atmosphere, to obtain a polymer of an aromatic liquid crystalline polyester resin having a FT of 309° C. (advanced polymer). In this stage, weight reduction was 1.3%.

(3) Granulation

The resulted advanced polymer was melt-kneaded by a PCM-30 twin screw extruder manufacture by Ikegai Co., Ltd. at a die head temperature of 329° C. and a screw rotation of 100 rpm to obtain an aromatic liquid crystalline polyester resin pellet having a FT of 269° C. The melt tension of this resin pellet at 319° C. (FT+50° C.) was 24 g, and the logarithmic viscosity (η inh) measured at 60° C. was 3.83 dl/g. The melt-viscosity is shown in Table 1.

(4) Blown Film Formation

The resulted aromatic liquid crystalline polyester resin pellet was made into a film using the same apparatus as in Example 1(4) onto head portion of which a tubular die having a diameter of 25 mm φ and a die gap of 0.75 mm had been amounted, at a cylinder temperature of 315° C., a die head temperature of 315° C. and a winding speed of 5 to 40 m/min, to obtain a film having a folding width of 150 to 160 mm. The bubble was stable, the film thickness was 43 to 52 μm at a winding speed of 5 m/min, 10 to 17 μm at a winding speed of 30 m/min, and the film appearance was excellent and no protruding portion of insufficient melt was observed. The water vapor permeation rate of the film obtained at a winding speed of 5 m/min was 0.4 g/m²·24 hr, and oxygen permeability was 2 cc/m²·24hr·1 atm. The light transmittance at 600 nm of a film having a thickness of 4 to 6 μm was 50%. The strength of the film is shown in Table 2.

Comparative Example 1

(1) Melt-polymerization (corresponding to composition ration of terephthalic acid/isophthalic acid=75/25 (mol %))

In the same manner as in Examples 1, 979.8 g (7.09 mol) of p-hydroxybenzoic acid (POB), 440.3 g (2.36 mol) of 4,4'-dihydroxybiphenyl (DOD), 293.8 g (1.77 mol) of terephthalic acid (TPA), 97.9 g (0.59 mol) of isophthalic acid (IPA) and 1328 g (13.0 mol) of acetic anhydride were charged. The temperature of the mixture was raised with conducting acetylation and removing acetic acid, and melt-polymerization was conducted at 320° C. for 1 hours, and the product was taken out in a molten state and solidified, and then pulverized.

(2) Solid Phase Polymerization

The polymer was subjected to solid phase polymerization under nitrogen atmosphere for 4 hours at a final treating temperature of 270° C. to obtain an advanced polymer of the aromatic liquid crystalline polyester resin (FT=327° C.).

(3) Granulation

The resulted advanced polymer was melt-kneaded by a twin screw extruder as in Example 1(3) at a die head temperature of 329° C. and a screw rotation of 100 rpm to obtain a resin pellet having a FT of 324° C. The melt tension of this resin pellet at 354° C. (FT+30° C.) was 1.3 g. The melt-viscosity is shown in Table 1.

(4) Blown Film Formation

The resulted aromatic liquid crystalline polyester resin pellet was tried to made into a film as the same manner with Example 1(4), at a cylinder temperature of 315° C. and a die head temperature of 320° C., however, the pellet was not melted and a film could not be formed.

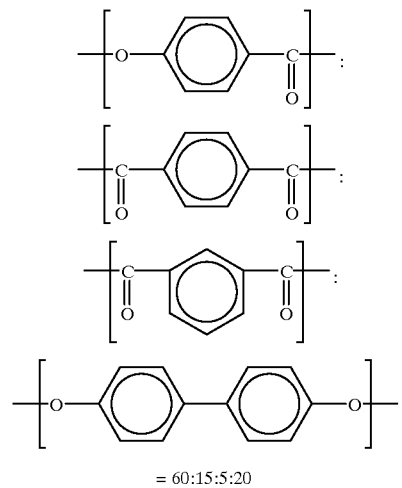

= 60:15:5:20

TABLE 1

| | | 100 sec⁻¹ | | | 1000 sec⁻¹ | | |
|---|---|---|---|---|---|---|---|
| Measuring temperature | FT (° C.) | $\eta_1$ FT | $\eta_2$ FT + 20 | $\eta_2/\eta_1$ | $\eta_1$ FT | $\eta_2$ FT + 20 | $\eta_2/\eta_1$ |
| Example 1 | 256 | 42800 | 12570 | 0.29 | 6581 | 2733 | 0.42 |
| Example 2 | 245 | 43650 | 18260 | 0.42 | 8149 | 4203 | 0.52 |
| Example 3 | 279 | 45650 | 13500 | 0.30 | 6833 | 2733 | 0.40 |
| Example 4 | 269 | 42800 | 19500 | 0.46 | 8520 | 4170 | 0.49 |
| Comparative example 1 | 324 | 38000 | 2300 | 0.06 | 6500 | 550 | 0.09 |

TABLE 2

| | Molding conditions | | | | Evaluation of film | | | | | |
| --- | --- | --- | --- | --- | --- | --- | --- | --- | --- | --- |
| | | | | | MD direction | | | TD direction | | |
| | Winding speed (m/min) | Thickness (μm) | Blow ratio | Draw ratio | Tensile strength (kg/mm$^2$) | Elongation (%) | Elastic modulus (kg/mm$^2$) | Tensile strength (kg/mm$^2$) | Elongation (%) | Elastic modulus (kg/mm$^2$) |
| Example 4 | 5 | 45 ± 5 | 4.2 | 4 | 21.78 | 6.5 | 82600 | 9.89 | 3.4 | 55000 |
| | 30 | 14 ± 4 | 4.3 | 12.5 | 21.66 | 3.6 | 97500 | 6.86 | 4.8 | 30500 |
| Comparative example 1 | film formation was impossible | | | | not measured | | | not measured | | |

(1) Aromatic Liquid Crystalline Polyester of Component (α)

Referential Example 1

Production of aromatic liquid crystalline polyester A-1

(1) Melt-polymerization

A 3 liter four-necked separable flask carrying a Y-shaped adaptor equipped with a Dimroth condenser, a nitrogen introducing tube and a thermocouple for measuring inner temperature, an having an anchor shape stirring blade and having a thermocouple also outside the flask was used. Into this polymerization vessel were charged 979.8 g (7.09 mol) of p-hydroxybenzoic acid (POB), 440.3 g (2.36 mol) of 4,4'-dihydroxybiphenyl (DOD), 117.9 g (0.71 mol) of terephthalic acid (TPA), 275–0 g (1.66 mol) of isophthalic acid (IPA) and 1328 g (13.0 mol) of acetic anhydride, and the outer temperature of the flask was raised to 150° C. with a mantle heater under nitrogen flow, and acetylation reaction was conducted for about 3 hours under reflux with stirring at about 200 rpm.

Following the acetylation reaction, the Dimroth condenser was exchanged with a Liebig condenser, and the temperature was raised at a rate of 1° C./min and kept at 320° C. for about 2 hours to conduct polymerization with removing acetic acid and excess of acetic anhydride. On the way of the polymerization, sampling was conducted at 1 hour of the polymerization, and the flow temperature was measured to find it was 223° C.

Af ter about 2 hours melt polymerization at 320° C., the stirring was terminated, and the polymer was taken out in a molten statea The resulted polyester was solidified in a meanwhile. The yield was 1583 g (99.0% yield).

The same procedure was repeated three times, and the resulted polyester was cut into about 3 to 5 cm squares, then, pulverized into a crude particle using a grinding machine, then, the flow temperature (FT) was measured to find it was 230° C.

This prepolymer was placed on an aluminum tray which was charged into a furnace in nitrogen atmosphere. After replacing completely the inside of the furnace with nitrogen, then the furnace was heated from room temperature to 200° C. over 1 hour under nitrogen atmosphere, and further heated up to 240° C. over 7 hours (temperature raising rate was about 0.1° C./mim) and kept for 5 hours to conduct solid polymerization, then, cooled under nitrogen atmosphere and a solid polymerization powder was obtained (advanced polymer). The advanced polymer has a FT of 280° C. and the logarithmic viscosity was 3.3 dl/g. The polymer is abbreviated as A-1. The polymer showed optical anisotropy in melt. The repeating structure of the aromatic liquid crystalline polyester A-1 is as follows.

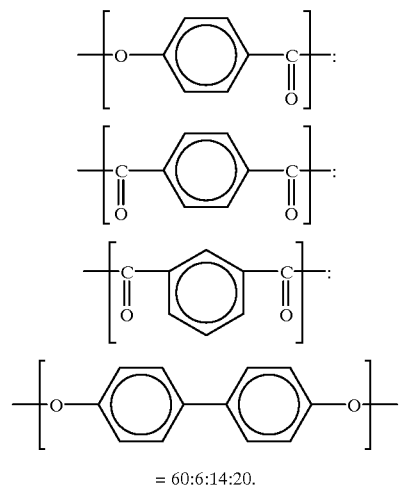

= 60:6:14:20.

The resulted polymer was melt-kneaded by a PCM-30 twin screw extruder manufactured by Ikegai Co., Ltd. at a die head temperature of 300° C. and a screw rotation of 100 rpm to obtain pellets having a FT of 255° C. The melt tension of the pellets at 295° C. (FT+40° C.) was 1.2 g.

Referential Example 2

Production of aromatic liquid crystalline polyesters A-2 and A-3.

According to Referential Example 1 except that the component ratios of TPA/IPA were changed to 10/90 (A-2) or 50/50 (A-3), while keeping the total amount of terephthalic acid (TPA) and isophthalic acid (IPA) was kept constant at 2.36 mol. melt-polymerization was conducted.

In the solid phase polymerization, the furnace was heated from room temperature to 190° C. over 1 hour, and to 200° C. over 30 minutes, and further heated up to 260° C. over 10 hours and kept for 5 hours at that temperature to conduct solid polymerization. Advanced polymers of solid polymerization A-2 and A-3 were obtained. Both advanced polymers showed optical anisotropy melt.

A-2: TPA/IPA=10/90 (mole%), FT=283° C., logarithmic viscosity=2.6 dl/g.

A-3: TPA/IPA=50/50 (mole%), FT=299cC, logarithmic viscosity=2.9 dl/g.

A-2 was melt-kneaded by a PCM-30 twin screw extruder manufacture by Ikegai Co., Ltd. at a die head temperature of 293° C. and a screw rotation of 80 rpm to obtain a pellet having a FT of 245° C. The melt tension of this resin pellet at 295° C. (FT+50° C.) was 1.4 g.

A-3 was melt-kneaded by a PCM-30 twin screw extruder manufactured by Ikegai Co., Ltd. at a die head temperature of 310° C. and a screw rotation of 100 rpm to obtain a pellet having a FT of 279° C. The melt tension of this resin pellet at 309° C. (FT+30° C.) was 1.9 g.

Referential Example 3

Production of aromatic liquid crystalline polyester A-4
(1) Melt-polymerization

A 3 liter four-necked separable flask carrying a Y-shaped adaptor equipped with a Dimroth condenser, a nitrogen introducing tube and a thermocouple for measuring inner temperature, an having an anchor shape stirring blade and having a thermocouple also outside the flask was used. Into this polymerization vessel were charged 979.8 g (7.09 mol) of p-hydroxybenzoic acid (POB), 440.3 g (2.36 mol) of 4,4'-dihydroxybiphenyl (DOD), 117.9 g (0.71 mol) of 3terephthalic acid (TPA), 275.0 g (1.66 mol) of isophthalic acid (IPA) and 1328 g (13.0 mol) of acetic anhydride, and the outer temperature of the flask was raised to 150° C. with a mantle heater under nitrogen flow, and acetylation reaction was conducted for about 3 hours under reflux with stirring at about 200 rpm.

Following the acetylation reaction, the Dimroth condenser was exchanged with a Liebig condenser, and the temperature was raised at a rate of 1° C./min and kept at 320° C. for about 2 hours to conduct polymerization with removing acetic acid and excess of acetic anhydride On the way of the polymerization, sampling was conducted at 1 hour of the polymerization, and the flow temperature was measured to find it was 223° C.

After about 2 hours melt polymerization at 320° C., the stirring was terminated, and the polymer was taken out in a molten state.

The same procedure was repeated three times, and the resulted polyester was cut into about 3 to 5 cm squares, then, pulverized into a crude particle using a grinding machine, then, the flow temperature (FT) was measured to find it was 232° C.

This prepolymer was placed on an aluminum tray which was charged into a furnace in nitrogen atmosphere. After replacing completely the inside of the furnace with nitrogen, then the furnace was heated from room temperature to 200° C. over 1 hour under nitrogen atmosphere, and further heated up to 270° C. over 12 hours (temperature raising rate was about 0.1° C./min) and kept for 5 hours to conduct solid polymerization, then, cooled under nitrogen atmosphere and a solid polymerization powder was obtained (advanced polymer). The advanced polymer has a FT of 314° C. and the logarithmic viscosity was 3.8 dl/g. The polymer is abbreviated as A-4. The polymer showed optical anisotropy in melt.

A-4 was melt-kneaded by a TEX-30 twin screw extruder manufacture by Nihon Seiko Co., Ltd. at a die head temperature of 315° C. and a screw rotation of 200 rpm to obtain a pellet having a FT of 260° C. The melt tension of this resin pellet at 310° C. (FT+50° C.) was 10.3 g.
(2) Copolymers of Component (β)

B-1: Bondfast 7L (Sumitomo Chemical Co., Ltd.) Composition: ethylene/glycidyl methacrylate/methyl acrylate=67/3/30.

MFR(190° C., 2.16 kg load)=9 g/10 min.

Stiffness modulus=60 kg/cm$^2$.

B-2: A copolymer rubber was obtained according to JP-A-61-127709.

Methylacrylate/ethylene/glycidyl methacrylate=59.0/38.7/2.3 (weight ratio). Mooney viscosity=15.

Example 5

90% by weight of the advanced polymer (A-1) and 10 weight % of (B-1) were mixed homogeneously, and melt-kneaded by a PCM-30 twin screw extruder manufacture by Ikegai Co., Ltd. at a die head temperature of 291° C. and a screw rotation of 80 rpm to obtain a resin composition pellet having a FT of 255° C. The melt-viscosity is shown in Table 3. The melt tension is shown in Table 4.

The resulted aromatic liquid crystalline polyester resin composition was made into a film using a Labo Plasto mill (manufactured by Toyo Seiki Seisaku-sho Ltd.) to which a twin screw extruder having a diameter of 30 mm φ was installed and onto head portion of which a tubular die having a diameter of 25 mm φ and a die gap of 0.75 mm was mounted, at a cylinder temperature of 280–290° C., a die head temperature of 290° C. and a winding speed of 20 m/min, to obtain a film having a folding width of 150 mm. The stability of the film-forming process was good, the film thickness was 14 to 21 μm, and the film appearance of the film was excellent. The oxygen gas permeability was 5.7 cc/m$^2$·24 hr·1 atm, and the water permeability was 0.46 g/m$^2$·24 hr·1 atm.

Example 6

80% by weight of the advanced polymer (A-1) and 20 weight % of (B-1) were mixed homogeneously, and melt-kneaded by a PCM-30 twin screw extruder manufacture by Ikegai Co., Ltd. at a die head temperature of 265° C. and a screw rotation of 100 rpm to obtain a resin composition pellet having a FT of 237° C. The melt-viscosity is shown in Table 3. The melt tension is shown in Table 4.

The resulted aromatic liquid crystalline polyester resin composition was made into a film using the same film forming apparatus of Example 5, at a cylinder temperature of 270–275° C., a die head temperature of 275° C. and a winding speed of 10 m/min, to obtain a film having a folding width of 150 mm. The stability of the film-forming process was good, the film thickness was 28 to 33 μm, and the film appearance of the film was excellent.

Example 7

90% by weight of the advanced polymer (A-4) and 10 weight % of (B-2) were mixed homogeneously, and melt-kneadecd by a PCM-30 twin screw extruder manufacture by Ikegai Co., Ltd. at a die head temperature of 320° C. and a screw rotation of 100 rpm to obtain a resin composition pellet having a FT of 267° C. The melt-viscosity is shown in Table 3. The melt tension is shown in Table 4.

Example 8

90% by weight of the advanced polymer (A-2) and 10 weight % of (B-1) were mixed homogeneously, and melt-kneaded by a PCM-30 twin screw extruder manufacture by Ikegai Co., Ltd. at a die head temperature of 293° C. and a screw rotation of 100 rpm to obtain a resin composition pellet having a FT of 247° C. The melt-viscosity is shown in Table 3. The melt tension is shown in Table 4.

The resulted aromatic liquid crystalline polyester resin composition was made into a film using the same film forming apparatus of Example 5, at a cylinder temperature of 270–275° C., a die head temperature of 276° C. and a winding speed of 10 m/min, to obtain a film having a folding width of 150 mm. The film forming stability was good, the film thickness was 25 to 30 μm, and the film appearance of the film was good.

Example 9

90% by weight of the advanced polymer (A-3) and 10 weight % of (B-1) were mixed homogeneously, and melt-kneaded by a PCM-30 twin screw extruder manufacture by Ikegai Co., Ltd. at a die head temperature of 310° C. and a screw rotation of 100 rpm to obtain a resin composition pellet having a FT of 282° C. The melt-viscosity is shown in Table 3. The melt tension is shown in Table 4.

The resulted aromatic liquid crystalline polyester resin composition was made into a film using the same film forming apparatus of Example 5, at a cylinder temperature of 310° C., a die head temperature of 310° C. and a winding speed of 20 m/min, to obtain a film having a folding width of 150 mm. The film forming stability was good, the film thickness was 15 to 22 μm, and the film appearance of the film was good.

Comparative Example 2

According to Referential Example 1, into 5L SUS polymerization vessel were charged 979.8 g (7.09 mol) of p-hydroxybenzoic acid (POB), 440.3 g (2.36 mol) of 4,4'-dihydroxybiphenyl (DOD), 293.8 g (1.77 mol) of terephthalic acid (TPA), 97.9 g (0.59 mol) of isophthalic acid (IPA) and 1328 g (13.0 mol) of acetic anhydride, and the temperature was raised with conducting acetylation reaction and removing acetic acid. After melt-polymerization, the polymer was taken out in a molten state, and pulverized. The flow temperature (FT) was 260° C.

This prepolymer was heated to 200° C. over 2 hour under nitrogen atmosphere, and further heated up to 270° C. over 3 hours and kept for 3 hours to conduct solid polymerization, an advanced polymer of a liquid crystalline polyester (A-5) was obtained. The advanced polymer has a FT of 327° C. The polyester has a ratio of TPA/IPA=75/25 (molar ratio).

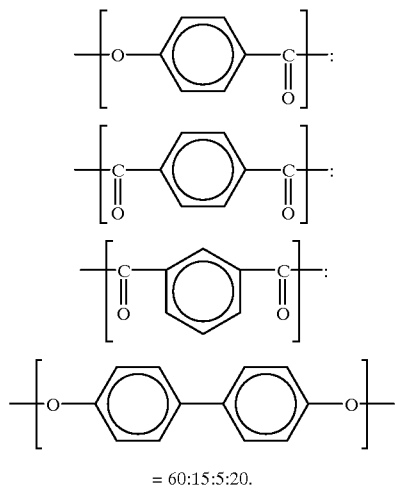

= 60:15:5:20.

The polymer was melt kneaded by a PCM-30 twin screw extruder manufacture by Ikegai Co., Ltd. at a die head temperature of 330° C. and a screw rotation of 80 rpm to obtain a granulated pellet having a FT of 324° C. The melt tension (MT) (measured at FT+40° C.) was 0.8 g.

85% by weight of the advanced polymer (A-5) and 15 weight % of (B-1) were mixed homogeneously, and melt-kneaded by a PCM-30 twin screw extruder manufacture by Ikegai Co., Ltd. at a die head temperature of 329° C. and a screw rotation of 80 rpm to obtain a resin composition pellet having a FT of 326° C. The melt-viscosity is shown in Table 3. The melt tension is shown in Table 4.

The resulted aromatic liquid crystalline polyester resin composition was attempted to be made into a film using the same film forming apparatus of Example 5, at a cylinder temperature of 305° C., a die head temperature of 310° C., but the composition did not melt and any films could not be obtained.

TABLE 3

| Measuring temperature | FT (° C.) | $\eta_1$ FT | $\eta_2$ FT + 20 | $\eta_2/\eta_1$ | $\eta_1$ FT | $\eta_2$ FT + 20 | $\eta_2/\eta_1$ |
|---|---|---|---|---|---|---|---|
| | | 100 sec$^{-1}$ | | | 1000 sec$^{-1}$ | | |
| Example 5 | 255 | 29300 | 14200 | 0.48 | 6120 | 3140 | 0.51 |
| Example 6 | 237 | 27000 | 20700 | 0.77 | 5730 | 4160 | 0.73 |
| Example 7 | 267 | 35320 | 17160 | 0.49 | 9240 | 4600 | 0.50 |
| Example 8 | 247 | 40050 | 18510 | 0.46 | 7110 | 3920 | 0.55 |
| Example 9 | 282 | 31730 | 12570 | 0.40 | 5560 | 2620 | 0.46 |
| Comparative example 2 | 326 | 35050 | 10230 | 0.29 | 9340 | 2690 | 0.29 |

TABLE 4

| | FT (° C.) | MT (g) | Measuring Temperature (° C.) |
|---|---|---|---|
| Example 5 | 255 | 2.1 | 295 |
| Example 6 | 237 | 2.2 | 297 |
| Example 7 | 267 | 9.2 | 327 |
| Example 8 | 247 | 2.0 | 297 |
| Example 9 | 282 | 5.1 | 312 |
| Comparative example 2 | 326 | 3.3 | 366 |

The aromatic liquid crystalline polyester resin and resin composition thereof of the present invention exhibits smaller temperature dependency of melt viscosity and tends to show wider molding processing temperature range as compared with a known wholly aromatic liquid crystalline polyester resin, and the melt tension thereof can be increased with suppressing increase in processing temperature, and film forming processability thereof is excellent. A film made of the aromatic liquid crystalline polyester resin has sufficient heat-resistance and improved low temperature molding processability as a wrapping material, and has an excellent gas barrier property, and further has little protruding portion of insufficient melt and the appearance thereof is excellent, therefore, it can be used as a film material for various wrapping uses such as food wrapping, drug wrapping, cosmetics wrapping, electric material wrapping and the like.

What is claimed is:

1. An aromatic liquid crystalline polyester resin film obtained by inflation-molding an aromatic liquid crystalline polyester resin comprising 30 to 80 mol % of the following repeating unit (A), 10 to 35 mol % of the following repeating unit (B) and 10 to 35 mol % of the following repeating unit (C):

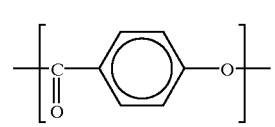

(A)

(B)

in the formula, Ar represents a divalent aromatic group,

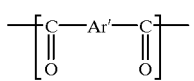
(C)

in the formula, Ar' represents two or more selected from

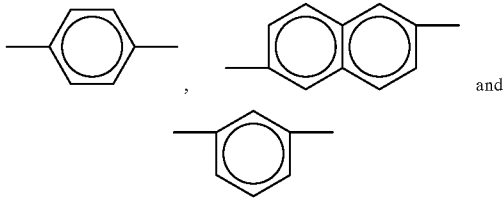
and and the content of

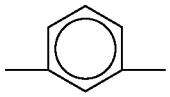

based on the total of Ar' is 40–95 mole %, and having a logarithmic viscosity of 1.5 dl/g or more, a flow temperature of 300° C. or less, and a melt tension measured at a temperature higher than the flow temperature by 25° C. or more of 1.0 g or more, and the flow temperature means a temperature (° C.) at which the melt viscosity measured by a capillary type rheometer is 48,000 poise when a resin which has been melted by heating at a temperature raising rate of 4° C./min is extruded through a nozzle having an internal diameter of 1 mm and a length of 10 mm under a load of 100 kgf/cm$^2$, at a blow ratio (TD drawing magnification) of 1.5 to 15 and draw ratio (MD drawing magnification) of 1.5 to 40.

2. The aromatic liquid crystalline polyester resin film according to claim 1, wherein the repeating unit (B) is the following repeating unit (B1)

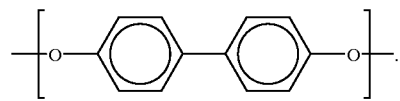
(B1)

3. The aromatic liquid crystalline polyester resin film according to claim 1, wherein the repeating unit (C) comprises 60 to 5 mol % of the following repeating unit (C1) and 40 to 95 mol % of the following repeating unit (C2)

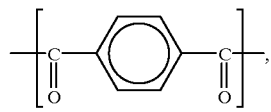
(C1)

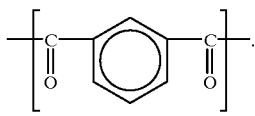
(C2)

4. The aromatic liquid crystalline polyester resin film according to claim 1, wherein the ratio of the melt viscosity (η1) measured at a shear rate of 100 sec$^{-1}$ or 1000 sec$^{-1}$ at the flow temperature of the aromatic liquid crystalline polyester resin and the melt viscosity (η2) measured at the same shear rate as in η1 at a temperature higher than the flow temperature by 20° C. (η2/η1) is from 0.10 to 0.80.

5. An aromatic liquid crystalline polyester resin obtained by charging 30 to 80 mol % of a compound represented by the following formula (I), 10 to 35 mol % of a compound represented by the following formula (II) and 10 to 35 mol % of a compound represented by the following formula (III) and into a reaction vessel, polycondensing the charged mixture at a temperature from 270 to 350° C. to produce an aromatic liquid crystalline polyester resin having a flow temperature of 210° C. or more and lower than the polycondensation reaction temperature by 30° C. or more, discharging the aromatic liquid crystalline polyester resin in a molten state from the reaction vessel and solidifying the resin, then, pulverizing the solidified resin into particles having a particle size of 3 mm or less and treating the particles at a temperature from 200 to 310° C. still in the solid state under inert gas atmosphere for 1 to 24 hours, and granulating the particles under heat-melted condition into pellets:

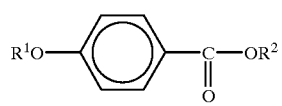
(I)

in the formula, R$^1$ represents a hydrogen atom, formyl group, acetyl group, propionyl group or benzoyl group, and R$^2$ represents a hydrogen atom, methyl group, ethyl group, propyl group, benzyl group or phenyl group, $$R^3O—Ar—OR^3 \quad (II)$$

in the formula, Ar represents a divalent aromatic group, and R$^3$ represents a hydrogen atom, acetyl group, propionyl group or benzoyl group,

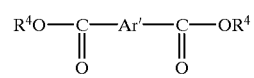
(III)

in the formula, Ar' represents two or more selected from

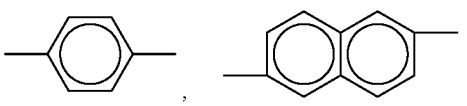
and

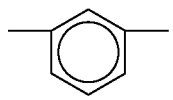

and the content of

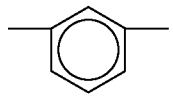

based on the total of Ar' is 40–95 mole %, and R⁴ represents a hydrogen atom, methyl group, ethyl group, propyl group, benzyl group or phenyl group.

6. A method for producing an aromatic liquid crystalline polyester resin comprising the steps of charging 30 to 80 mol % of a compound represented by the following formula (I), 10 to 35 mol % of a compound represented by the following formula (II) and 10 to 35 mol % of a compound represented by the following formula (III) and into a reaction vessel, polycondensing the charged mixture at a temperature from 270 to 350° C. to produce an aromatic liquid crystalline polyester resin having a flow temperature of 210° C. or more and lower than the polycondensation reaction temperature by 30° C. or more, discharging the aromatic liquid crystalline polyester resin in a molten state from the reaction vessel and solidifying the resin, then, pulverizing the solidified resin into particles having a particle size of 3 mm or less and treating the powder at a temperature from 200 to 310° C. still in the solid state under inert gas atmosphere for 1 to 24 hours, and granulating the product under heat-melted condition into pellets:

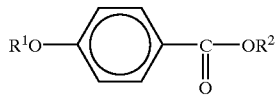 (I)

in the formula, $R^1$ represents a hydrogen atom, formyl group, acetyl group, propionyl group or benzoyl group, and $R^2$ represents a hydrogen atom, methyl group, ethyl group, propyl group, benzyl group or phenyl group, $$R^3O-Ar-OR^3 \quad (II)$$

in the formula, Ar represents a divalent aromatic group, and $R^3$ represents a hydrogen atom, acetyl group, propionyl group or benzoyl group,

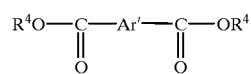 (III)

in the formula, Ar' represents two or more selected from

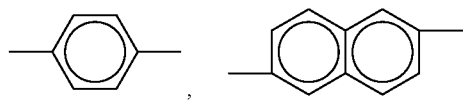 and based on the total of Ar' is 40–95 mole %, and R⁴ represents a hydrogen atom, methyl group, ethyl group, propyl group, benzyl group or phenyl group.

7. A method for producing an aromatic liquid crystalline polyester resin film, comprising inflation-molding an aromatic liquid crystalline polyester resin comprising 30 to 80 mol % of the following repeating unit (A), 10 to 35 mol % of the following repeating unit (B) and 10 to 35 mol % of the following repeating unit (C):

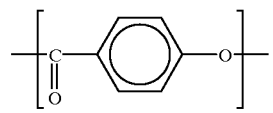 (A)

 (B)

in the formula, Ar represents a divalent aromatic group,

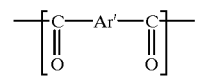 (C)

in the formula, Ar' represents two or more selected from

and the content of

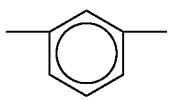

based on the total of Ar' is 40–95% mole %, and having a logarithmic viscosity of 1.5 dl/g or more, a flow temperature of 300° C. or less, and a melt tension measured at a temperature higher than the flow temperature by 25° C. or more of 1.0 or more, and the flow temperature means a temperature (° C.) at which the melt viscosity measured by a capillary type rheometer is 48,000 poise when a resin which has been melted by heating at a temperature raising rate of 4° C./min is extruded through a nozzle having an internal diameter of 1 mm and a length of 10 mm under a load of 100 kgf/cm$^2$, at a blow ratio (TD drawing magnification) of 1.5 to 15 and a draw ratio (MD drawing magnification) of 1.5 to 40.

8. The method according to claim 7, wherein the repeating unit (B) is the following repeating unit (B1)

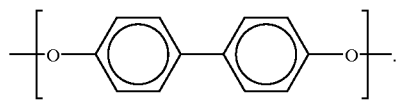
(B1)

9. The method according to claim 7, wherein the repeating unit (C) comprises 60 to 5 mol % of the following repeating unit (C1) and 40 to 95 mol % of the following repeating unit (C2)

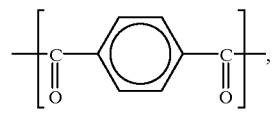
(C1)

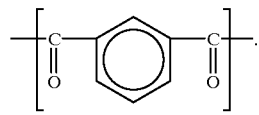
(C2)

10. The method according to claim 7, wherein the ratio of the melt viscosity ($\eta 1$) measured at a shear rate of 100 sec$^{-1}$ or 1000 sec$^{-1}$ at the flow temperature of the aromatic liquid crystalline polyester resin and the melt viscosity ($\eta 2$) measured at the same shear rate as in $\eta 1$ at a temperature higher than the flow temperature by 20° C. ($\eta 2/\eta 1$) is from 0.10 to 0.80.

* * * * *